US012771763B2

(12) United States Patent
Nagasaka

(10) Patent No.: US 12,771,763 B2
(45) Date of Patent: Oct. 20, 2026

(54) DATA COMMUNICATION SYSTEM AND DATA COMMUNICATION METHOD

(71) Applicant: FUJI CORPORATION, Chiryu (JP)

(72) Inventor: Nobuo Nagasaka, Okazaki (JP)

(73) Assignee: FUJI CORPORATION, Chiryu (JP)

( * ) Notice: Subject to any disclaimer, the term of this patent is extended or adjusted under 35 U.S.C. 154(b) by 90 days.

(21) Appl. No.: 18/840,530

(22) PCT Filed: Mar. 9, 2022

(86) PCT No.: PCT/JP2022/010263
§ 371 (c)(1),
(2) Date: Aug. 22, 2024

(87) PCT Pub. No.: WO2023/170813
PCT Pub. Date: Sep. 14, 2023

(65) Prior Publication Data
US 2025/0184411 A1 Jun. 5, 2025

(51) Int. Cl.
*H04L 69/165* (2022.01)
*H04L 67/568* (2022.01)
*H04W 80/06* (2009.01)

(52) U.S. Cl.
CPC .......... *H04L 69/165* (2013.01); *H04L 67/568* (2022.05); *H04W 80/06* (2013.01)

(58) Field of Classification Search
CPC ............................ H04L 69/165; H04L 67/568
See application file for complete search history.

(56) References Cited

U.S. PATENT DOCUMENTS

| | | | | |
|---|---|---|---|---|
| 8,662,398 B1 * | 3/2014 | Egyed | H04B 10/116 | 235/472.01 |
| 2012/0178487 A1 | 7/2012 | Schmidtke et al. | | |
| 2014/0280690 A1 * | 9/2014 | Allen | G06Q 10/1091 | 709/217 |
| 2014/0297791 A1 * | 10/2014 | Tanji | H04L 69/164 | 709/217 |
| 2020/0248965 A1 * | 8/2020 | Austen | F27B 9/40 | |

FOREIGN PATENT DOCUMENTS

| | | |
|---|---|---|
| JP | 2006-323455 A | 11/2006 |
| JP | 2007-214755 A | 8/2007 |
| JP | 2021-141444 A | 9/2021 |

OTHER PUBLICATIONS

International Search Report issued on Jun. 7, 2022, PCT/JP2022/010263 filed on Mar. 9, 2022, 2 pages.

* cited by examiner

*Primary Examiner* — Clayton R Williams
(74) *Attorney, Agent, or Firm* — Oblon, McClelland, Maier & Neustadt, L.L.P.

(57) ABSTRACT

A data communication system for transmitting data to an accumulation database via a wireless section includes a storage processing section configured to acquire accumulation target data and transmit the data to a temporary storage database via a wired section using TCP to temporarily store the data, a transmission processing section configured to extract the data from the temporary storage database and transmit the data via the wireless section using UDP, and a reception processing section configured to receive the data transmitted via the wireless section and accumulate the data in the accumulation database.

11 Claims, 5 Drawing Sheets

Fig. 2

| | CONNECTION DESTINATION DATABASE |
|---|---|
| LINE MANAGEMENT DEVICE 22A | STORAGE DB 26A |
| LINE MANAGEMENT DEVICE 22B | STORAGE DB 26B |

Fig. 3

| | CONNECTION DESTINATION DATABASE |
|---|---|
| WIRELESS AUXILIARY DEVICE 34 | ACCUMULATION DB 36 |

DATA COMMUNICATION SYSTEM AND DATA COMMUNICATION METHOD

TECHNICAL FIELD

The present description discloses a data communication system and a data communication method.

BACKGROUND ART

Conventionally, a system including an image server that accumulates image data captured by multiple work machines has been proposed (for example, see Patent Literature 1). In this system, image data captured by a working machine is transmitted to an image server via wireless communication conforming to, for example, the communication standard such as the fifth generation mobile communication system (5G), thereby eliminating the need for various wired installations.

PATENT LITERATURE

Patent Literature 1: JP-A-2021-141444

BRIEF SUMMARY

Technical Problem

In the system described above, for example, when wireless communication is performed using Transmission Control Protocol (TCP), it is necessary to transmit data subsequently while waiting for a reception confirmation response for data transmission. For this reason, when the reception of the response is delayed due to a wireless communication delay, a waiting time until the next data is transmitted becomes long, and a timeout error or the like may occur.

A main object of the present disclosure is to appropriately perform the transmission of data via a wireless section without delay.

Solution to Problem

The present disclosure employs the following means in order to achieve the main object described above.

A data communication system according to an embodiment of the present disclosure is a data communication system for transmitting data to an accumulation database via a wireless section, including:

- a storage processing section configured to acquire accumulation target data and transmit the data to a temporary storage database via a wired section using TCP to temporarily store the data;
- a transmission processing section configured to extract the data from the temporary storage database and transmit the data via the wireless section using UDP; and
- a reception processing section configured to receive the data transmitted via the wireless section and accumulate the data in the accumulation database.

The data communication system of the present disclosure can appropriately perform the transmission of data via a wireless section without delay.

BRIEF DESCRIPTION OF DRAWINGS

FIG. 2 is a diagram illustrating an example of a connection destination database of line management device 22.

FIG. 3 is a diagram illustrating an example of a connection destination database of wireless auxiliary device 34.

DESCRIPTION OF EMBODIMENTS

Figure 1:
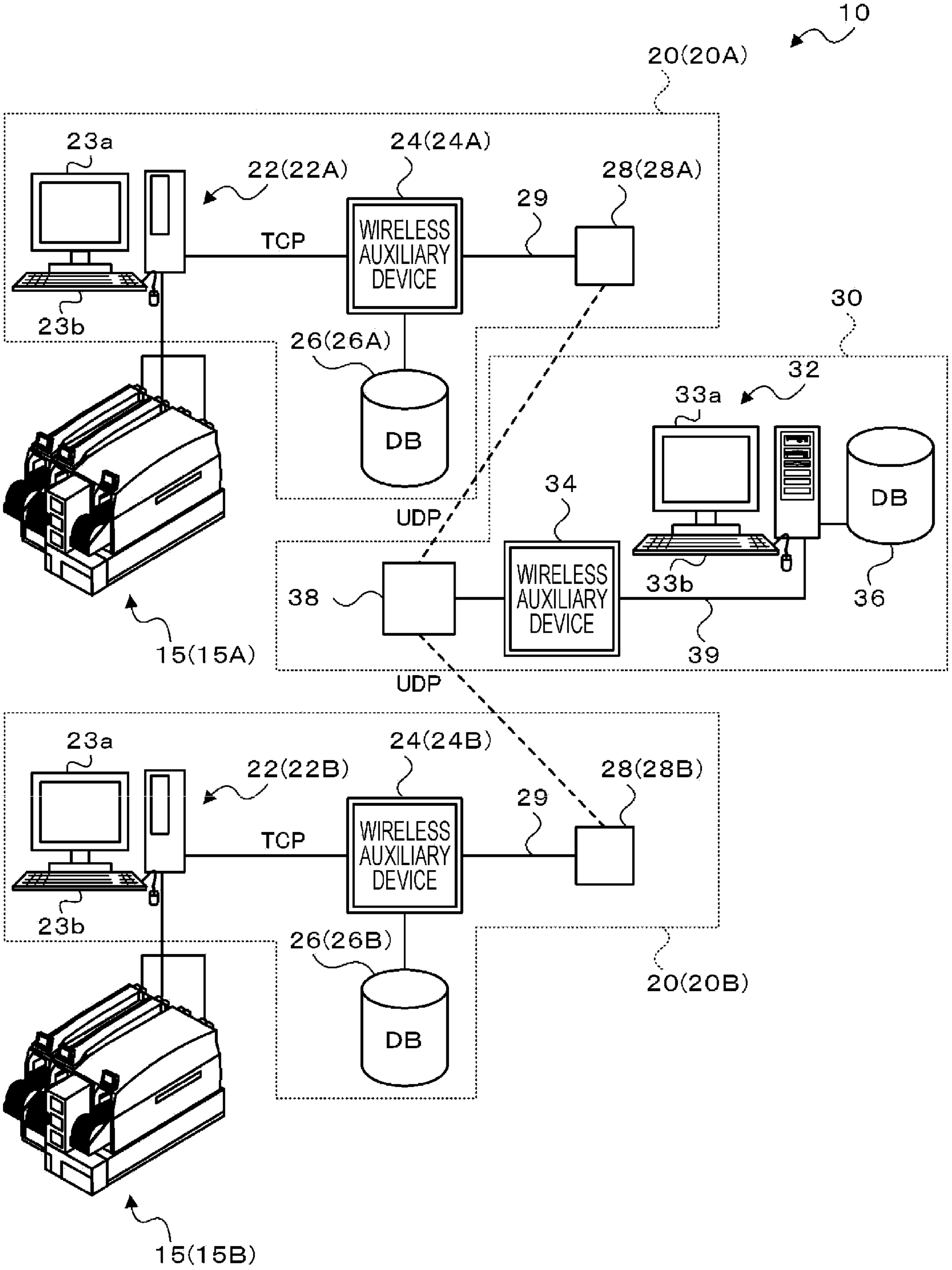
FIG. 1 is a configuration diagram illustrating an outline of a configuration of production system 10.

Next, embodiments of the present disclosure will be described with reference to the accompanying drawings. FIG. 1 is a configuration diagram illustrating an outline of a configuration of production system 10. Production system 10 includes one or more production lines 15, line management system 20 that individually manages each production line 15, and integrated management system 30 that accumulates various data of each production line 15 and integrally manages production system 10.

Production line 15 is configured as a component mounting line including a mounting device that collects components supplied from, for example, a feeder or a tray and mounts the components on a board. Although two production lines 15A and 15B are illustrated in FIG. 1, the number of production lines may be one or three or more. Each production line 15 (15A, 15B) is configured in the same manner, and includes, in addition to the mounting device, a printing device that prints solder on a board, a reflow device that performs reflow processing on a board on which components are mounted, an inspection device that inspects a mounting state of the components, and the like. Hereinafter, production lines 15A and 15B will be described as production line 15 without being particularly distinguished.

In FIG. 1, two line management systems, that is, line management system 20A that manages production line 15A and line management system 20B that manages production line 15B are illustrated as line management system 20 that manages each production line 15. Each line management system 20 (20A, 20B) includes line management device 22 (22A, 22B), wireless auxiliary device 24 (24A, 24B), storage database (DB) 26 (26A, 26B), and wireless terminal 28 (28A, 28B), all of which can communicate via wired LAN 29. Since line management systems 20A and 20B are configured in the same manner as described above, line management systems 20A and 20B are hereinafter described as line management system 20 except when it is necessary to distinguish between line management systems 20A and 20B.

Line management device 22 is a computer including CPU, ROM, RAM, a storage device, a communication module, and the like, and includes display section 23*a* that displays various information, and input section 23*b* such as a mouse and a keyboard through which an administrator performs various types of operation input. Line management device 22 can communicate with each device on production line 15, and acquires various data related to production from each device. As the various data, for example, an operation log and an error code of each device, information of mounted components, a captured image, an inspection result of a board, and the like are acquired.

Wireless auxiliary device 24 is a computer including CPU, ROM, RAM, a storage device, a communication module, and the like. Storage DB 26 is a database accessible by line management device 22 and wireless auxiliary device 24, and is constructed in wireless auxiliary device 24 in the present embodiment. As described later, the data stored in storage DB 26 is transmitted to integrated management system 30 via wireless communication, accumulated in accumulation DB 36 of integrated management system 30, and then deleted. Therefore, storage DB 26 can also be considered as a temporary storage database in which the data is stored temporarily. Wireless terminal 28 performs radio wireless communication through wireless base station 38 of integrated management system 30 according to a predetermined wireless communication standard such as local 5G or Wi-Fi (registered trademark). That is, in the present embodiment, data is transmitted from line management system 20 to integrated management system 30 via the wireless section between wireless terminal 28 and wireless base station 38.

Integrated management system 30 includes integrated management device 32, wireless auxiliary device 34, accumulation database (DB) 36, and wireless base station 38, all of which can communicate via wired LAN 39.

Integrated management device 32 is a computer including CPU, ROM, RAM, a storage device, a communication module, and the like, and includes display section 33*a* that displays various information, and input section 33*b* such as a mouse and a keyboard through which an administrator performs various types of operation input. Integrated management device 32 supports creation of a production plan of production system 10 and manages various data transmitted from each line management system 20.

Wireless auxiliary device 34 is a computer including CPU, ROM, RAM, a storage device, a communication module, and the like. Accumulation DB 36 is a database accessible by integrated management device 32 and wireless auxiliary device 34, and is constructed in integrated management device 32 in the present embodiment. Wireless base station 38 functions as an access point accessible by multiple wireless terminals 28 of line management system 20, and performs radio wireless communication according to the predetermined wireless communication standard described above.

In production system 10, accumulation target data, such as various data related to production, is accumulated and managed in accumulation DB 36 of integrated management system 30. However, the connection destination database of line management device 22 of each line management system 20 is not set in accumulation DB 36. FIG. 2 is a diagram illustrating an example of a connection destination database of line management device 22. As illustrated, in line management device 22A, storage DB 26A in same line management system 20A is set as the connection destination. In line management device 22B, storage DB 26B in same line management system 20B is set as the connection destination. As described above, storage DB 26, which can communicate via the wired section using wired LAN 29, is set as the connection destination database of line management device 22, rather than accumulation DB 36. FIG. 3 is a diagram illustrating an example of a connection destination database of wireless auxiliary device 34. As illustrated, accumulation DB 36 in integrated management system 30 is set. As described above, accumulation DB 36, which can communicate via the wired section using wired LAN 39, is set as the connection destination database of wireless auxiliary device 34. The setting of these connection destination databases is performed by a setting operator through operations on a setting screen (not illustrated) in an initial setting during the construction of each line management system 20 and integrated management system 30, and the setting is maintained thereafter.

Figure 4:
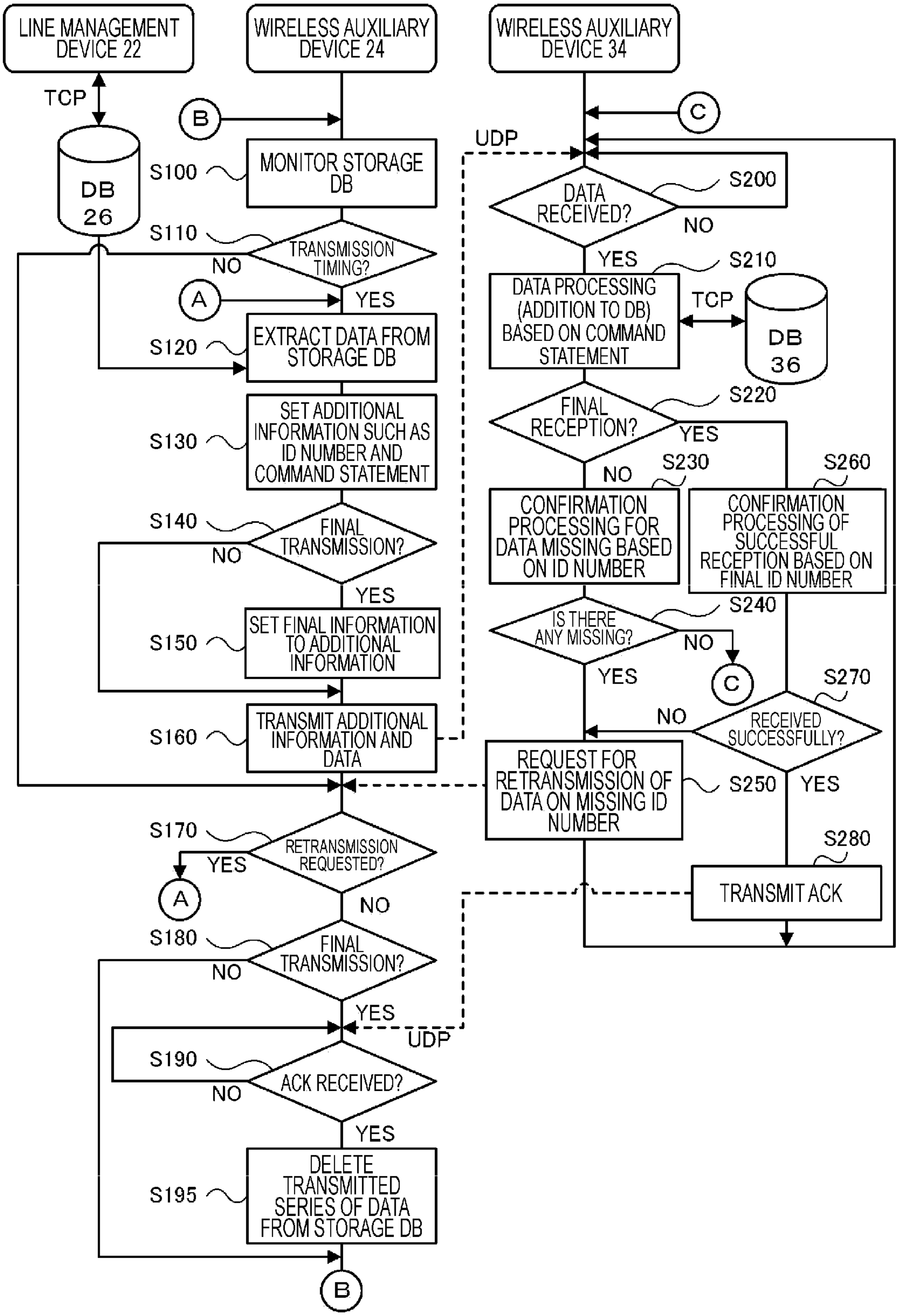
FIG. 4 is a sequence diagram illustrating an example of wireless communication processing.

Next, communication processing performed in production system 10 configured as described above, particularly the transmission of data in the wireless section will be described. FIG. 4 is a sequence diagram illustrating an example of wireless communication processing. In FIG. 4, illustrations of wireless terminal 28 and wireless base station 38 are omitted. In line management system 20 of the present embodiment, line management device 22 acquires data from production line 15 at any time, and transmits the data to storage DB 26 via the wired section using Transmission Control Protocol (TCP) to store the data. TCP is a communication protocol that requires an ACK (reception confirmation) indicating that the data has been successfully received, when the data is received. Therefore, line management device 22 performs data communication processing while repeating the transmission of the data to storage DB 26 and the reception of an ACK in response thereto.

Wireless auxiliary device 24 monitors storage DB 26 in which the data is stored in this manner (S100), determines whether it is the transmission timing of the data (S110), and proceeds to S170 when it is determined that it is not the transmission timing. On the other hand, wireless auxiliary device 24 determines that it is the transmission timing, for example, when new data is stored in storage DB 26, and extracts the data for one record from storage DB 26 (S120).

Next, wireless auxiliary device 24 sets an ID number, a command statement such as SQL, and a database name and table name of the transmission destination as additional information to be added to the data extracted for one record (S130). The ID number is identification information of data, and includes order information indicating a transmission order of a series of data. For example, when transmitting a series of data related to the production of one board for each record in units of packets, wireless auxiliary device 24 sets an ID number by combining the serial number of the board with order information indicating the transmission order of data (packets). Therefore, when transmitting the series of data subsequently, the serial number of the board remains unchanged, and the order information is incremented by one according to the number of transmissions, thereby setting the ID number. For example, in the series of data related to the production of one board, the number of transmissions may be several tens of thousands of times, such as 30,000 times or 40,000 times. The SQL statement is set up with instructions such as the addition or update of data to the database. The database name and table name of the transmission destination are determined in advance according to the type of data. By registering a part of the additional information by wireless auxiliary devices 24 and 34 in advance, for example, the transmission of a command statement, a database name and table name of the transmission destination, or the like may be omitted.

Subsequently, wireless auxiliary device 24 determines whether the current transmission is the final transmission of a series of data (S140). When it is determined that the transmission is not the final transmission, wireless auxiliary device 24 transmits the additional information set in S130 and the data for one record extracted from storage DB 26 to wireless auxiliary device 34 using User Datagram Protocol (UDP) (S160). As described above, in the present embodiment, the data is transmitted via the wired section, from line management device 22 to storage DB 26, using TCP, and the data is transmitted via the wireless section between wireless auxiliary device 24 (wireless terminal 28) and wireless auxiliary device 34 (wireless base station 38) using UDP. UDP is a protocol that does not require an ACK. Therefore, since wireless auxiliary device 24 can transmit the data subsequently without waiting for the reception of an ACK, it is possible to transmit the data quickly without causing a transmission delay.

On the other hand, wireless auxiliary device 34 waits to receive the data transmitted via the wireless section (S200), and when it is determined that the data is received, wireless auxiliary device 34 performs data processing based on the command statement added to the data (S210). For example, processing such as adding the received data to accumulation DB 36 is performed. In S210, wireless auxiliary device 34 transmits the data via the wired section, which reaches up to accumulation DB 36, using TCP, thereby reliably transmitting the data to accumulation DB 36 to be accumulated.

Next, wireless auxiliary device 34 determines whether the reception is the reception of the final data based on whether the additional information of the data received this time includes the final information (S220). When it is determined that the reception is not the reception of the final data, wireless auxiliary device 34 performs confirmation processing for data missing based on the ID number included in the additional information (S230), and determines whether there is missing data (S240). In S230 and S240, wireless auxiliary device 34 confirms whether the ID number (part of the order information) of the data received this time is one value larger than the ID number of the data received last time, and determines that there is no missing data when the ID number is one value larger. When the ID number is not larger by one value but is larger by two or more values, wireless auxiliary device 34 determines that there is missing data. When the data of the new board is transmitted for the first time, wireless auxiliary device 34 need only confirm whether the ID number (part of the order information) has started from a predetermined initial value and determine whether there is missing data.

When it is determined in S240 that there is no missing data, wireless auxiliary device 34 determines that the current data has been appropriately transmitted and received according to a transmission order, and returns to S200. When it is determined in S240 that there is missing data, wireless auxiliary device 34 transmits a request to wireless auxiliary device 24 to retransmit the data on the missing ID number (S250), and returns to S200.

On the other hand, wireless auxiliary device 24 determines whether the retransmission of the data is requested from wireless auxiliary device 34 (S170), and when it is determined that the retransmission is requested, wireless auxiliary device 24 returns to S120 and performs processing of S120 to S160. That is, wireless auxiliary device 24 performs processing to retransmit the data on the missing ID number. On the other hand, when it is determined that the retransmission of the data is not requested, wireless auxiliary device 24 determines whether the transmission of the data performed in S160 is the final transmission (S180). Wireless auxiliary device 24 returns to S100 when the data has not been transmitted in S160 because it is determined in S110 that it is not the transmission timing, or when the data has been transmitted in S160 but this transmission is not the final transmission.

When the transmission and reception of the data in the wireless section are repeated, and wireless auxiliary device 24 determines that the transmission is the final transmission in S140, the final information is set to the additional information (S150), and processing proceeds to S160. The final information is specific information indicating the final transmission in a series of data. As the final information, specific order information, which is not used in normal order information, may be used. For example, even when a series of data (packets) is transmitted several tens of thousands of times, specific order information such as "99999" is not normally used, and thus the information may be used.

On the other hand, when wireless auxiliary device 34 determines in S220 that the reception is the reception of the final data, wireless auxiliary device 34 performs confirmation processing to determine whether all data up to the final data have been received successfully based on the final ID number (S260), and determines whether all the data have been received successfully (S270). When wireless auxiliary device 34 determines that all data up to the final data have not been received successfully, that is, there is missing data, wireless auxiliary device 34 transmits a request to wireless auxiliary device 24 to retransmit the data on the missing ID number (S250), and returns to S200.

When it is determined in S270 that all data up to the final data have been received successfully, wireless auxiliary device 34 transmits an ACK to wireless auxiliary device 24 (S280) and returns to S200. That is, in the present embodiment, when the final data is received, an ACK indicating that the data has been received successfully up to the end is transmitted to wireless auxiliary device 24.

On the other hand, when it is determined in S180 that the final transmission has been performed, wireless auxiliary device 24 waits to receive an ACK from wireless auxiliary device 34 (S190). When it is determined that an ACK has been received, wireless auxiliary device 24 deletes the series of data transmitted up to the final data from storage DB (S195), and returns to S100. As described above, storage DB 26 temporarily stores data. Therefore, when wireless auxiliary device 24 confirms that the transmission and reception of the series of data have been completed successfully based on the reception of an ACK, wireless auxiliary device 24 deletes the series of data from storage DB 26. When an ACK cannot be received even after a predetermined time has elapsed in S190, wireless auxiliary device 24 may determine that the final data has not been transmitted successfully, and take appropriate actions such as retransmission.

Figure 5:
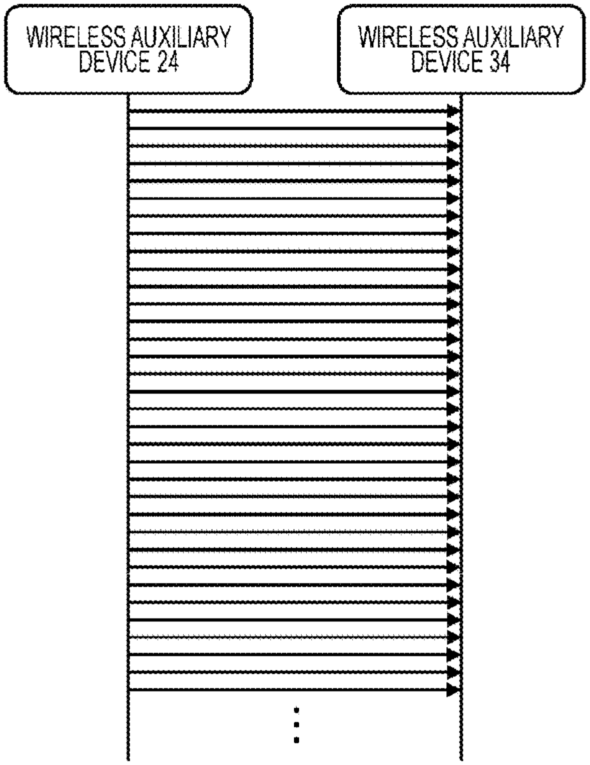
FIG. 5 is a diagram illustrating an example of data transmission in wireless communication according to the present embodiment.
Figure 6:
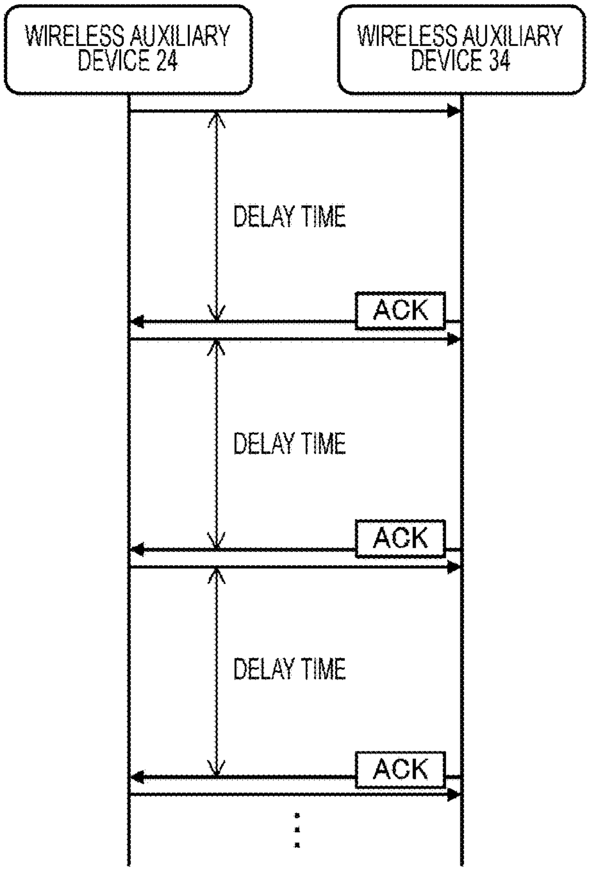
FIG. 6 is a diagram illustrating an example of data transmission in wireless communication according to a comparative example.

Here, FIG. 5 is a diagram illustrating an example of data transmission in wireless communication according to the present embodiment. FIG. 6 is a diagram illustrating an example of data transmission in wireless communication according to a comparative example. In the comparative example, communication in a wireless section is performed using TCP. Therefore, after transmitting the data, wireless auxiliary device 24 transmits the next data after receiving the ACK transmitted from wireless auxiliary device 34. That is, every time wireless auxiliary device 24 transmits data, a delay time of several milliseconds, such as 4 milliseconds, occurs to wait for the reception of an ACK. On the other hand, in the present embodiment, since the communication in the wireless section is performed using UDP as described above, wireless auxiliary device 24 does not need to wait for the reception of an ACK. Therefore, wireless auxiliary device 24 can continuously transmit the data in a relatively short cycle such as about 0.5 milliseconds.

Figure 7:
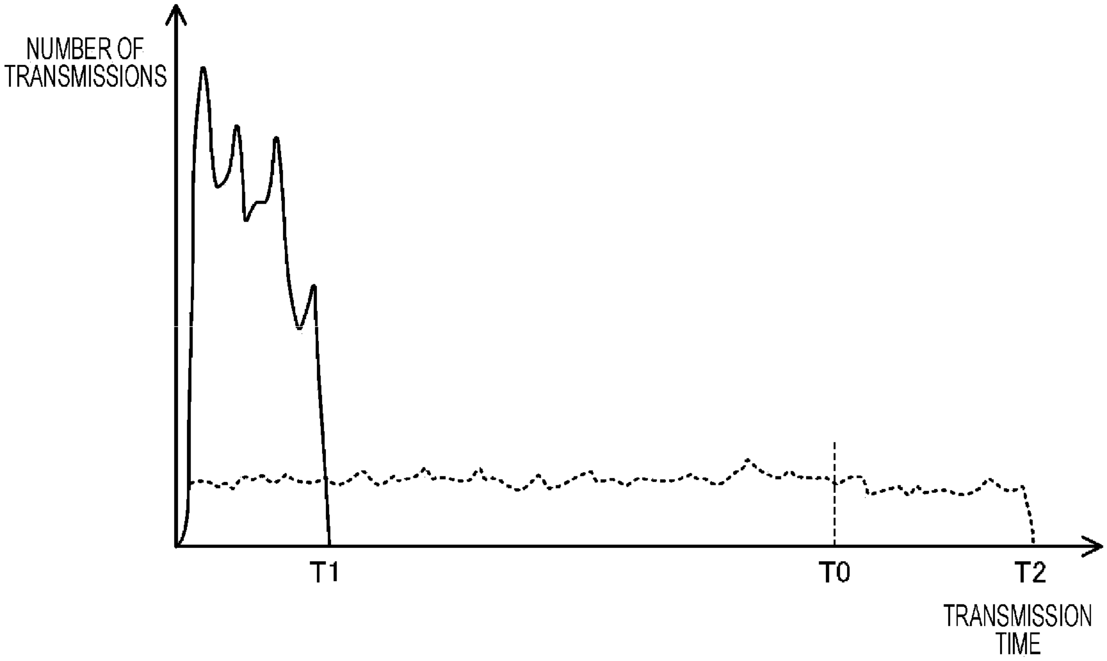
FIG. 7 is a diagram illustrating an example of time transition of the number of data transmissions.

FIG. 7 is a diagram illustrating an example of time transition of the number of data transmissions. In FIG. 7, the vertical axis indicates the number of transmissions of data (packets), and the horizontal axis indicates the elapsed time from the start of transmission. The time transition of the present embodiment is shown with a solid line, and the time transition of the comparative example is shown with a dotted line. In the comparative example, since a delay time occurs due to waiting for the reception of an ACK, the number of transmissions of data per unit of time is reduced. In addition, as described above, in a series of data related to the production of one board, the number of transmissions may be several tens of thousands of times. Therefore, in the comparative example, transmission time T2 until the completion of transmission of a series of data becomes a long time, and a timeout error occurs beyond time T0 determined in advance. On the other hand, in the present embodiment, since the data is continuously transmitted in a relatively short cycle, it is possible to transmit the data with a large number of transmissions from the start of transmission. Therefore, transmission time T1 until the completion of transmission becomes a relatively short time, and there is no timeout error, and the data can be reliably transmitted. As described above, even in the present embodiment, a delay time occurs to wait for the reception of an ACK for the final data transmission, but the effect on the overall transmission time is minimal, and it is not problematic.

As described above, the data communication system provided in production system 10 transmits data to storage DB 26 via the wired section using the first protocol (TCP) to temporarily store the data, extracts the data from storage DB 26, and transmits the data via the wireless section using the second protocol (UDP), which is less reliable than the first protocol, but offers a shorter transmission time. In other words, the data communication system transmits data to storage DB 26 via the wired section using the protocol (TCP) that requires an ACK as a reception confirmation to temporarily stores the data, extracts the data from storage DB 26, and transmits the data via the wireless section using the protocol (UDP) that does not require an ACK.

Here, a correspondence relationship between the elements of the present embodiment and the elements of the present disclosure will be clarified. Line management device 22 of the present embodiment corresponds to a storage processing section of the present disclosure, wireless auxiliary device 24 and wireless terminal 28 correspond to a transmission processing section, and wireless auxiliary device 34 and wireless base station 38 correspond to a reception processing section. Storage DB 26 corresponds to a temporary storage database, accumulation DB 36 corresponds to an accumulation database, and line management system 20 (line management device 22, wireless auxiliary device 24, storage DB 26, and wireless terminal 28), wireless auxiliary device 34, and wireless base station 38 correspond to a data communication system. In addition, in the present embodiment, an example of the wireless communication method of the present disclosure is also clarified by describing the wireless communication processing.

The data communication system provided in production system 10 described above transmits data to storage DB 26 via the wired section using TCP to temporarily store the data, extracts the data from storage DB 26, and transmits the data via the wireless section using UDP. Therefore, in the wireless section, the data can be continuously transmitted in a relatively short cycle without waiting for the reception of an ACK, and thus the data can be transmitted at substantially the same time interval as in a wired LAN. Accordingly, it is possible to appropriately perform the transmission of the data via the wireless section without delay. In the wired section where there is little risk of wireless delay, the data can be more reliably transmitted using TCP.

Further, in the data communication system, data is transmitted with an ID number including order information indicating the transmission order of a series of data attached thereto, and missing data in the received data is determined based on the order information. Therefore, even when the data transmission via the wireless section is performed using UDP that does not require an ACK, it is possible to appropriately handle missing data.

Further, in the data communication system, data is transmitted with the final information attached to the final data, and it is determined whether the series of data has been received successfully up to the end based on the final information. Therefore, it is possible to reliably transmit and receive the series of data up to the end.

In addition, line management device 22 is configured such that storage DB 26 is set as a connection destination database during initial setting, and wireless auxiliary device 34 is configured such that accumulation DB 36 is set as a connection destination database during initial setting. Therefore, there is no need to set a connection destination every time the data is transmitted, and the data can be efficiently transmitted.

It is needless to say that the present disclosure is not limited to the embodiment described above in any way, and hence can be implemented in various aspects as long as the aspects fall within the technical scope of the present disclosure.

In the embodiment described above, the connection destination databases of line management device 22 and wireless auxiliary device 34 are set during initial setting, but the present disclosure is not limited thereto. It may be set by an operator or the like at the start of production, for example.

In the embodiment, whether the series of data has been received successfully up to the end is determined based on the final information, an ACK is transmitted when it is determined that the series of data has been received successfully, and a retransmission of the data is requested when it is determined that the series of data has not been received successfully, but the present disclosure is not limited thereto. For example, even when it is determined that the data has been received successfully, an ACK need not be transmitted, that is, no response is made when the data is received successfully, and when it is determined that the data has not been received successfully, the retransmission of the data may be requested. Further, for example, a case is considered in which transmission of the next series of data is started due to some abnormality while wireless auxiliary device 34 does not receive the final data successfully. In this case, wireless auxiliary device 34 determines that the serial number part of a board in the ID number of the received data differs from the ID number of the previously received data in a state where the data with the final information attached has not been received. Therefore, wireless auxiliary device 34 need only transmit, to wireless auxiliary device 24, information indicating that the data with the final information attached, that is, the final data has not been received successfully. In this way, when it is determined that the final data has not been received successfully, information indicating the fact may be transmitted to wireless auxiliary device 24. In addition, wireless auxiliary device 24 may transmit the data without attaching the final information even if the data is final, and wireless auxiliary device 34 need not perform a reception confirmation based on the final information.

In the embodiment, missing data is determined every time the data is received, but the present disclosure is not limited thereto, and missing data may be determined every time a predetermined number of pieces of data are received, or missing data may be determined every predetermined time. Alternatively, missing data may be collectively determined when the final data is received.

In the embodiment, data is transmitted with an ID number including order information indicating the transmission order of a series of data attached thereto, and missing data in the received data is determined based on the order information, but the present disclosure is not limited thereto. That is, it may be permissible to transmit the data without attaching order information, assuming that the determination of missing data is not performed. However, in order to appropriately handle missing data while quickly transmitting the data, it is preferable to adopt the configuration as in the embodiment.

In the embodiment, when an ACK for the transmission of the final data is received, the data is deleted from storage DB 26, that is, the data is deleted from storage DB 26 immediately after the transmission of the data is completed, but the present disclosure is not limited thereto. Storage DB 26 may be any storage where the data is temporarily stored, may delete the data when a predetermined time elapses after the completion of transmission of the data, or may delete the data in order from the oldest data among the transmitted data when the data of a predetermined amount of data or more is stored in storage DB 26.

In the embodiment, storage DB 26 is constructed in wireless auxiliary device 24, but the present disclosure is not limited thereto, and storage DB 26 may be constructed in a data server separate from wireless auxiliary device 24. Further, wireless auxiliary device 24 is provided as hardware separate from line management device 22, but the present disclosure is not limited thereto, and line management device 22 may include software for achieving functions of wireless auxiliary device 24. Wireless auxiliary device 34 is provided as hardware separate from integrated management device 32, but the present disclosure is not limited thereto, and integrated management device 32 may include software for achieving functions of wireless auxiliary device 34. Accumulation DB 36 is constructed in integrated management device 32, but the present disclosure is not limited thereto, and accumulation DB 36 may be constructed in a data server different from integrated management device 32.

In the embodiment, data is transmitted via the wired section using TCP, and data is transmitted via the wireless section using UDP, but the present disclosure is not limited thereto. The data need only be transmitted via the wired section using the first protocol, and the data need only be transmitted via the wireless section using the second protocol, which is less reliable than the first protocol, but offers a shorter transmission time. Although the second protocol is less reliable than the first protocol, the second protocol can also be regarded as a protocol having a real-time property or having a high transmission speed as a result because a delay time due to waiting for the reception of an ACK does not occur. In addition, the data need only be transmitted via the wired section using a protocol that requires a reception confirmation, and the data need only be transmitted via the wireless section using a protocol that does not require a reception confirmation. The fact that the reception confirmation is not required means that the reception confirmation is not essential, and as in the present embodiment, the reception confirmation may be used in some parts (final data).

INDUSTRIAL APPLICABILITY

The present disclosure can be used in a technical field of transmitting data via wireless communication using radio waves.

REFERENCE SIGNS LIST

10 production system, 15, 15A, 15B production line, 20, 20A, 20B line management system, 22, 22A, 22B line management device, 23*a* display section, 23*b* input section, 24, 24A, 24B wireless auxiliary device, 26, 26A, 26B storage DB, 28, 28A, 28B wireless terminal, 29 wired LAN, 30 integrated management system, 32 integrated management device, 33*a* display section, 33*b* input section, 34 wireless auxiliary device, 36 accumulation DB, 38 wireless base station, 39 wired LAN

The invention claimed is:

1. A data communication system for transmitting data to an accumulation database via a wireless section, comprising:
one or more processors configured as
a storage processing section configured to acquire accumulation target data and transmit the data to a temporary storage database at a storage processing section side via a wired section using TCP to temporarily store the data;
a transmission processing section configured to extract the data from the temporary storage database and transmit the data continuously to the accumulation database via the wireless section using UDP without using TCP; and
a reception processing section configured to receive the data transmitted via the wireless section and accumulate the data in the accumulation database.

2. The data communication system according to claim 1,
wherein the transmission processing section is configured to attach order information indicating a transmission order to a series of accumulation target data and transmit the series of data subsequently using UDP, and
the reception processing section is configured to determine missing data in the received data based on the order information and request the transmission processing section to retransmit the data when it is determined that there is missing data.

3. The data communication system according to claim 2,
wherein the transmission processing section is configured to attach final information indicating finality to final data among the series of data and transmit the final data using UDP, and
the reception processing section is configured to determine whether the series of data has been received successfully up to the end based on the final information, transmit a message indicating that the series of data has been received successfully to the transmission processing section when it is determined that the series of data has been received successfully, and request the transmission processing section to retransmit the data when it is determined that the series of data has not been received successfully.

4. The data communication system according to claim 1,
wherein the storage processing section is configured such that the storage database is set as a connection destination database during initial setting, and
the reception processing section is configured such that the accumulation database is set as a connection destination database during initial setting.

5. The data communication system according to claim 1,
wherein the storage processing section is configured to delete the data from the temporary storage database after a final wireless ACK has been received indicating that the data has been received successfully in the accumulation database.

6. A data communication method of transmitting data to an accumulation database via a wireless section, comprising:

(a) a step of acquiring accumulation target data and transmitting the data to a temporary storage database at a storage processing section side via a wired section using TCP to temporarily store the data;

(b) a step of extracting the data from the temporary storage database and transmitting the data continuously to the accumulation database via the wireless section using UDP without using TCP; and (c) a step of receiving the data transmitted via the wireless section and accumulating the data in the accumulation database.

7. The data communication method according to claim 6, further comprising deleting the data from the temporary storage database after a final wireless ACK has been received indicating that the data has been received successfully in the accumulation database.

8. A data communication method of transmitting data to an accumulation database via a wireless section, comprising:

(a) a step of acquiring accumulation target data and transmitting the data to a temporary storage database at a storage processing section side via a wired section using a first protocol to temporarily store the data;

(b) a step of extracting the data from the temporary storage database and transmitting the data continuously to the accumulation database via the wireless section using a second protocol, which is less reliable than the first protocol, but offers a shorter transmission time without using the first protocol; and (c) a step of receiving the data transmitted via the wireless section and accumulating the data in the accumulation database.

9. The data communication method according to claim 8, further comprising deleting the data from the temporary storage database after a final wireless ACK has been received indicating that the data has been received successfully in the accumulation database.

10. A data communication method of transmitting data to an accumulation database via a wireless section, comprising:

(a) a step of acquiring accumulation target data and transmitting the data to a temporary storage database at a storage processing section side via a wired section using a protocol that requires a reception confirmation to temporarily store the data;

(b) a step of extracting the data from the temporary storage database and transmitting the data continuously to the accumulation database via the wireless section using a protocol that does not require a reception confirmation without using the protocol that requires a reception confirmation; and (c) a step of receiving the data transmitted via the wireless section and accumulating the data in the accumulation database.

11. The data communication method according to claim 10, further comprising deleting the data from the temporary storage database after a final wireless ACK has been received indicating that the data has been received successfully in the accumulation database.

* * * * *